(12) United States Patent
Swed

(10) Patent No.: US 12,182,982 B1
(45) Date of Patent: Dec. 31, 2024

(54) OPTICAL AND OTHER SENSORY PROCESSING OF COMPLEX OBJECTS

(71) Applicant: Calodar Ltd., Haifa (IL)

(72) Inventor: Joseph Swed, Tel Aviv (IL)

(73) Assignee: Calodar Ltd., Haifa (IL)

( * ) Notice: Subject to any disclaimer, the term of this patent is extended or adjusted under 35 U.S.C. 154(b) by 0 days.

(21) Appl. No.: 18/644,261

(22) Filed: Apr. 24, 2024

Related U.S. Application Data

(60) Provisional application No. 63/618,671, filed on Jan. 8, 2024.

(51) Int. Cl.

| | |
|---|---|
| *G06T 7/00* | (2017.01) |
| *G06T 7/11* | (2017.01) |
| *G06T 7/62* | (2017.01) |
| *G06V 10/774* | (2022.01) |
| *G06V 10/82* | (2022.01) |
| *G06V 20/68* | (2022.01) |

(52) U.S. Cl.
CPC .............. *G06T 7/0002* (2013.01); *G06T 7/11* (2017.01); *G06T 7/62* (2017.01); *G06V 10/7753* (2022.01); *G06V 10/82* (2022.01); *G06V 20/68* (2022.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30128* (2013.01)

(58) Field of Classification Search
CPC . G06T 7/0002; G06T 7/11; G06T 7/62; G06T 2207/10016; G06T 2207/10024; G06T 2207/10028; G06T 2207/20081; G06T 2207/20084; G06T 2207/30128; G06V 10/7753; G06V 10/82; G06V 20/68
See application file for complete search history.

(56) References Cited

U.S. PATENT DOCUMENTS

| | | | |
|---|---|---|---|
| 9,659,225 B2 * | 5/2017 | Joshi | ........................ G06Q 50/12 |
| 10,943,312 B2 * | 3/2021 | Lee | ..................... G06Q 30/0621 |
| 11,179,852 B2 * | 11/2021 | Choi | ....................... B25J 11/008 |

(Continued)

OTHER PUBLICATIONS

Shao, W. "Vision Based Food Nutrition Estimation via RGB-D Fusion Network" Food Chemistry 424, May 17, 2023, pp. 1-10 (Year: 2023).*

(Continued)

*Primary Examiner* — Mia M Thomas
(74) *Attorney, Agent, or Firm* — FINNEGAN, HENDERSON, FARABOW, GARRETT & DUNNER L.L.P.

(57) ABSTRACT

Systems and methods for optical and other sensory analysis of nutritional and other complex objects are disclosed. For example, techniques may include capturing an RGB-D image of a food using an integrated camera; inputting the RGB-D image into an instance detection network configured to detect food items; segmenting a plurality of food items from the RGB-D image into a plurality of masks, the plurality of masks representing individual food items; classifying a particular food item among the individual food items using a multimodal large language model; estimating a volume of the particular food item by overlaying an RGB image associated with the RGB-D image with a depth-map to create a point cloud; and estimating the calories of the particular food item using the estimated volume and a nutritional database.

20 Claims, 18 Drawing Sheets

(56) References Cited

U.S. PATENT DOCUMENTS

| | | | | |
|---|---|---|---|---|
| 11,481,751 | B1* | 10/2022 | Chaubard | G06V 10/82 |
| 11,663,683 | B2* | 5/2023 | Mimassi | G06Q 10/0832 |
| | | | | 705/15 |
| 11,688,504 | B2* | 6/2023 | Neumann | G06F 18/2155 |
| | | | | 706/25 |
| 11,972,512 | B2* | 4/2024 | Philip | G06T 7/50 |
| 2015/0278596 | A1* | 10/2015 | Kilty | G06T 3/00 |
| | | | | 382/113 |
| 2015/0325029 | A1* | 11/2015 | Li | G06T 1/0007 |
| | | | | 382/103 |
| 2018/0315162 | A1* | 11/2018 | Sturm | H04N 13/239 |
| 2019/0187720 | A1* | 6/2019 | Fowe | G01C 21/3676 |
| 2019/0209806 | A1* | 7/2019 | Allen | H04L 12/2829 |
| 2019/0340753 | A1* | 11/2019 | Brestel | G16H 15/00 |
| 2020/0189507 | A1* | 6/2020 | Green | F16P 3/00 |
| 2020/0394813 | A1* | 12/2020 | Theverapperuma | G06F 18/2431 |
| 2021/0027485 | A1* | 1/2021 | Zhang | G06T 7/11 |
| 2021/0233235 | A1* | 7/2021 | Roy | A01K 61/95 |
| 2022/0019852 | A1* | 1/2022 | Eyjolfsdottir | G06N 3/08 |
| 2022/0261601 | A1* | 8/2022 | Amato | G06F 18/214 |
| 2022/0282980 | A1* | 9/2022 | Winarski | G01C 21/3446 |
| 2023/0057604 | A1* | 2/2023 | Urtasun | G06V 10/757 |
| 2023/0143034 | A1* | 5/2023 | Wu | G06T 11/00 |
| | | | | 345/423 |
| 2023/0222817 | A1* | 7/2023 | Sun | G06N 3/08 |
| | | | | 382/103 |
| 2023/0222887 | A1* | 7/2023 | Muhsin | G06V 40/20 |
| 2023/0274549 | A1* | 8/2023 | Hajash | G06V 20/41 |
| | | | | 386/241 |
| 2023/0360442 | A1* | 11/2023 | Soryal | G08B 21/02 |
| 2023/0362479 | A1* | 11/2023 | Verma | H04N 23/64 |
| 2024/0013351 | A1* | 1/2024 | Liu | H04N 23/632 |
| 2024/0037749 | A1* | 2/2024 | Rasoulidanesh | G06V 10/806 |
| 2024/0070868 | A1* | 2/2024 | Yu | G06T 7/11 |
| 2024/0169563 | A1* | 5/2024 | Wen | G06T 7/11 |
| 2024/0233254 | A9* | 7/2024 | Golovanov | G06V 10/22 |

OTHER PUBLICATIONS

Adachi, K. "DepthGrillCam: A Mobile Application for Real-time Eating Action Recording Using RGB-D Images" MADiMa Oct. 10, 2022, ACM pp. 1-5. (Year: 2022).*

Kadam, P. "FVEstimator: A novel food volume estimator Wellness model for calorie measurement and healthy living" May 18, 2022, Measurement 198 pp. 1-12 (Year: 2022).*

Naritomi, S. "Real Scale Hungry Networks: Real Scale 3D Reconstruction of a Dish and a Plate using Implicit Function and a Single RGB-D Image" MADiMa Oct. 10, 2022 ACM, pp. 1-8. (Year: 2022).*

Sari, Y. "Measuring food volume from RGB-Depth image with point cloud conversion method using geometrical approach and robust ellipsoid fitting algorithm" Journal of Food Engineering 358 Jul. 19, 2023, pp. 1-16. (Year: 2023).*

* cited by examiner

OPTICAL AND OTHER SENSORY PROCESSING OF COMPLEX OBJECTS

CROSS-REFERENCE TO RELATED APPLICATION

This application claims the benefits of priority to U.S. Provisional App. No. 63/618,671, filed on Jan. 8, 2024, the entirety of which is incorporated by reference.

TECHNICAL FIELD

The disclosed embodiments relate to systems, methods, and devices for conducting optical and other sensory processing of complex objects. In particular, several disclosed embodiments relate to a non-transitory computer-readable medium configured to use an integrated camera to scan food, and other disclosed embodiments pertain to other types of processing.

BACKGROUND

Nutrition tracking and management systems may allow a user to track food intake and corresponding nutritional information. For example, systems may receive user input regarding types or categories of foods consumed during a meal. Such conventional systems may analyze the user input to provide nutritional content information. However, manually entering consumption information into a conventional nutrition tracking and management system may be time-consuming and inaccurate. For example, a user may not have time to manually track each item of food eaten during a day and may not be able to accurately determine the amount of food that has been consumed. A user may also not always be able to identify the exact food types that have been consumed in a meal, which may lead to further inaccuracies in nutrition tracking.

A solution to the inefficiencies and inaccuracies of manual nutrition tracking may be to analyze an image or frame of a meal to determine the nutritional intake. However, prior imaging tools are not sophisticated enough to capture complex objects such as food. For example, classification prediction models may fail to accurately predict the correct classification of a food item. Classification prediction models are trained on combinations of food items and not individual food items, which leads to inaccuracies in determining nutritional intake based on an image.

Therefore, to address these technical deficiencies in tracking nutritional intake, solutions should be provided to analyze an image received from an integrated camera to determine intake and nutritional estimates. Such solutions should provide efficient and accurate estimations of nutritional intake by allowing a user to scan a food item using a camera integrated with a user device. Such solutions should also use an instance detection model and an image segmentation model to accurately identify each food item in a received image. Solutions should also generate depth maps and point clouds to model the three-dimensional volume of a food item depicted in a two-dimensional image. Such solutions may allow for a more accurate determination of the volume of food consumed by a user, which may also allow for more precise calculations of the nutritional value a user receives from a food item. Therefore, in view of the shortcomings and problems with conventional approaches to sensory analysis of complex objects, there is a need for improved, unconventional systems and methods to accurately analyze food images.

SUMMARY

The disclosed embodiments describe non-transitory computer readable media for using an integrated camera to scan food. For example, in an embodiment, a non-transitory computer readable medium may include instructions that, when executed by at least one processor, may cause the at least one processor to perform operations for using an integrated camera to scan food. The operations may comprise capturing an RGB-D image of the food using the integrated camera, inputting the RGB-D image into an instance detection network configured to detect food items, the instance detection network having been trained on a plurality of reference food items using a neural network, segmenting a plurality of food items from the RGB-D image into a plurality of masks, the plurality of masks representing individual food items, classifying a particular food item among the individual food items using a multimodal large language model, estimating a volume of the particular food item by overlaying an RGB image associated with the RGB-D image with a depth-map to create a point cloud, and estimating the calories of the particular food item using the estimated volume and a nutritional database.

According to a disclosed embodiment, the operations may further comprise comparing a first RGB-D image before intake to a second RGB-D image after intake, and generating an intake estimate associated with the particular food item.

According to a disclosed embodiment, the operations may further comprise comparing a first RGB-D image after intake to a synthetic image.

According to a disclosed embodiment, the operations may further comprise pairing an unlabeled image with a verified mask from the plurality of masks representing an individual food item to optimize a trained classifier.

According to a disclosed embodiment, inputting the RGB-D image into the instance detection network may comprise creating a square around the individual food item.

According to a disclosed embodiment, inputting the RGB-D image into the instance detection network may comprise creating a mask representing multiple food items.

According to a disclosed embodiment, the point cloud may be a synthetic point cloud capable of being captured and stored for analysis.

According to a disclosed embodiment, the depth-map may be created by monocular depth estimation.

According to a disclosed embodiment, the operations may further comprise capturing a video segment using the integrated camera, and extracting a plurality of image frames from the video segment.

According to a disclosed embodiment, the extracted plurality of image frames may include the captured RGB-D image.

According to another disclosed embodiment, there may be a computer implemented method for scanning food. The computer implemented method may comprise capturing an RGB-D image of the food using the integrated camera, inputting the RGB-D image into an instance detection network configured to detect food items, segmenting a plurality of food items from the RGB-D image into a plurality of masks, the plurality of masks representing individual food items, classifying a particular food item among the individual food items using a multimodal large language model, estimating a volume of the particular food item by overlaying an RGB image associated with the RGB-D image with a depth-map to create a point cloud, and estimating the calories of the particular food item using the estimated volume and a nutritional database.

According to a disclosed embodiment, the computer implemented method may further comprise comparing a first RGB-D image before food intake to a second RGB-D image after food intake, and generating, based on the comparison, a food intake estimate associated with the particular food item.

According to a disclosed embodiment, the computer implemented method may further comprise pairing an unlabeled image with a verified mask from the plurality of masks representing an individual food item to update a trained classifier.

According to a disclosed embodiment, inputting the RGB-D image into the instance detection network may include at least one of: creating a square around the individual food item, or creating a mask representing multiple food items.

According to a disclosed embodiment, the depth-map may be created by monocular depth estimation.

According to a disclosed embodiment, the computer implemented method may further comprise creating training data for synthetic data generation through automatic dataset generation via an assets database, and generating segmented outputs from the synthetic data generation across various combinations of food items, lighting conditions, and other physical environments.

According to a disclosed embodiment, the segmented outputs may be used for volume and calorie estimation.

According to a disclosed embodiment, the computer implemented method may further comprise capturing a video segment using the integrated camera, and extracting a plurality of image frames from the video segment.

According to a disclosed embodiment, the extracted plurality of image frames may include the captured RGB-D image.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

Aspects of the present disclosure may include a non-transitory computer-readable medium configured to use an integrated camera to scan food. For example, in some embodiments, the non-transitory computer-readable medium may store executable code configured to perform operations that may comprise capturing an RGB-D image of a plurality of ingredients, inputting the RGB-D image into a nutritional estimation pipeline, using a multimodal large language model to analyze user profile data, the user profile data containing an intake log, an outtake log, and dietary choices, and generating a detailed recipe utilizing the plurality of ingredients based on the RGB-D image and the user profile data, the recipe including nutritional value estimates.

Aspects of the present disclosure may include a non-transitory computer-readable medium that may be configured to use an integrated camera to scan food. In some embodiments, the non-transitory computer-readable medium may store executable code that may be configured to perform operations that may comprise capturing an RGB-D image using the integrated camera, inputting the image into a nutritional estimation pipeline, using a multimodal large language model to analyze user profile data, the user profile data containing a user profile and past dietary log entries, and generating personalized dietary recommendations based on the image and the user profile data.

Aspects of the present disclosure may include a non-transitory computer-readable medium that may be configured to generate advertising recommendations. The non-transitory computer-readable medium may store executable code that may be configured to perform operations that may comprise capturing an RGB-D image using an integrated camera, inputting the RGB-D image into an instance detection network configured to detect each food item, the instance detection network having been trained on a plurality of reference food items, segmenting a particular food item from the RGB-D image into a mask, classifying the particular food item using a multimodal large language model, accessing a database of advertising content; and generating advertising content associated with the particular food item based on the database.

Aspects of the present disclosure may include a non-transitory computer-readable medium that may be configured to generate advertising recommendations. The non-transitory computer-readable medium may store executable code that may be configured to perform operations that may comprise capturing an RGB-D image, inputting the RGB-D image into an instance detection network configured to detect a plurality of food items, the instance detection network having been trained on a plurality of reference food items, segmenting a particular food item into a mask, classifying the particular food item using a multimodal large language model, allowing a user to provide a text caption to the image, and integrating with a social media application to allow posting.

Aspects of the present disclosure may include a non-transitory computer-readable medium that may be configured to generate advertising recommendations. The non-transitory computer-readable medium may store executable code that may be configured to perform operations that may comprise capturing an RGB-D image, inputting the RGB-D image into a nutritional estimation pipeline, generating an intake estimate based on the RGB-D image and the nutritional estimation pipeline, sending the intake estimate to a connected device, and receiving additional data from the connected device.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Consistent with disclosed embodiments, systems and methods for optical and sensory processing of complex objects are disclosed. As explained above, disclosed systems and methods improve analysis of complex objects such as food.

Figure 1A:
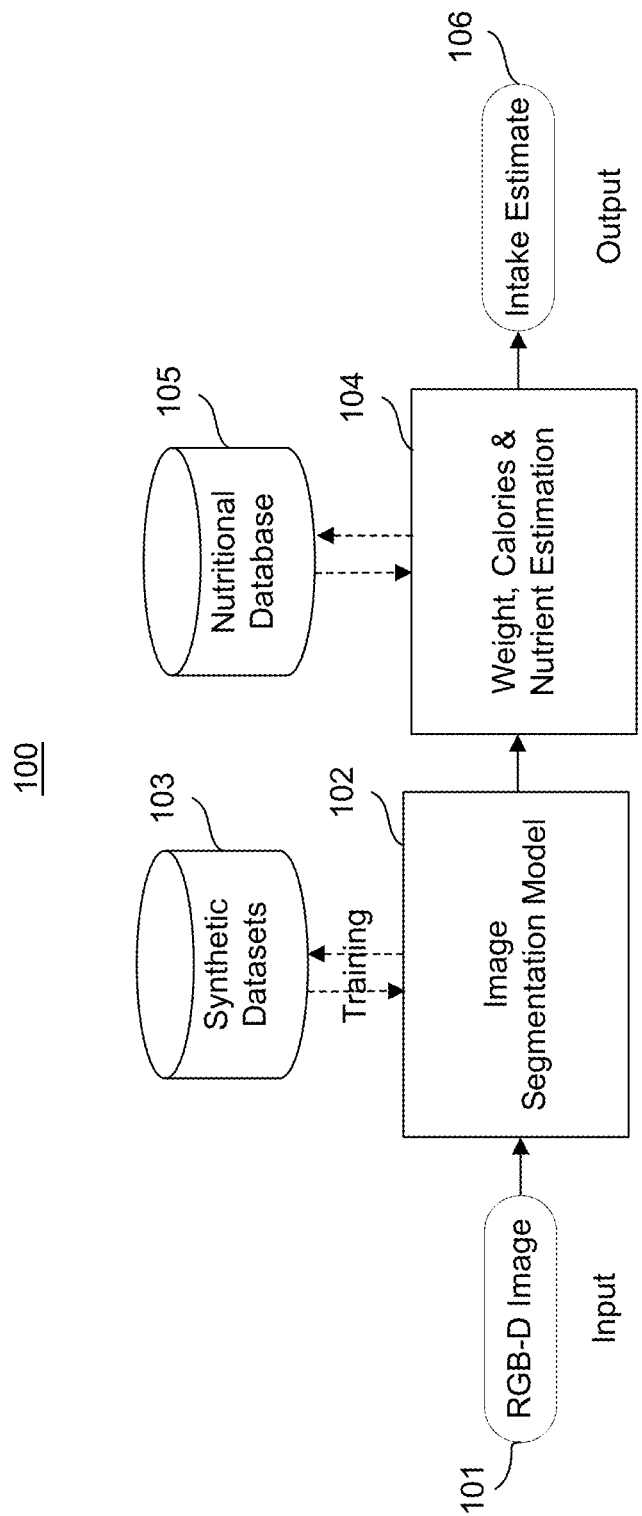
FIG. 1A depicts a process for estimating nutritional data through a series of algorithms, consistent with disclosed embodiments.

FIG. 1A depicts a nutritional pipeline 100 for analyzing an image to estimate nutritional data (e.g., calories, fat, protein, vitamins, carbohydrates, etc.), in accordance with disclosed embodiments. Analyzing received image or video frames to identify food items, or other items, may involve various forms of electronic analysis using a computing device. In some embodiments as discussed further below, computer image analysis may include using one or more image recognition algorithms to identify features of one or more frames of video content. Computer image analysis may be performed on individual frames, or may be performed across multiple frames, for example, to detect motion or other changes between frames. In some embodiments, computer image analysis may include object detection algorithms, such as Viola-Jones object detection, scale-invariant feature transform (SIFT), histogram of oriented gradients (HOG) features, convolutional neural networks (CNN), or any other forms of object detection algorithms. Other example algorithms may include feature detection algorithms, color-based detection algorithms, texture-based detection algorithms, shape-based detection algorithms, boosting-based detection algorithms, face detection algorithms, biometric recognition algorithms, or any other suitable algorithm for analyzing video frames.

In some embodiments, the computer image analysis may include using a neural network model trained using example image or video frames including previously identified food items, or other items, to thereby identify a similar food or other item in one or more image frames. In other words, images or frames of one or more videos that are known to be associated with a particular food or other item may be used to train a neural network model. The trained neural network model may therefore be used to identify whether one or more images or video frames are also associated with the food item or other item. In some embodiments, the disclosed techniques may further include updating the trained neural network model based on at least one of the analyzed images or frames. Accordingly, by identifying food items or other items in the obtained images or video frames using computer image analysis, disclosed embodiments may create efficiencies in data processing and image/video classification, reduce costs through automation, and improve accuracy in data classification.

As disclosed herein, machine learning algorithms (also referred to as artificial intelligence) may be employed for the purposes of analyzing the images or video frames to identify food items or other items. Such algorithms may be trained using training examples, such as described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs (e.g., images of particular food items) together with the desired outputs (e.g., classifications of food items) corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper-parameters, where the hyper-parameters may be set manually by a person or automatically by a process external to the machine learning algorithm (such as a hyper-parameter search algorithm), and the parameters of the machine learning algorithm may be set by the machine learning algorithm according to the training examples. In some implementations, the hyper-parameters may be set according to the training examples and the validation examples, and the parameters may be set according to the training examples and the selected hyper-parameters.

In some embodiments, trained machine learning algorithms (e.g., artificial intelligence algorithms) may be used to analyze inputs and generate outputs, for example in the cases described below. In some examples, a trained machine learning algorithm may be used as an inference model that, when provided with an input, generates an inferred output (e.g., particular classification of a food item). For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image. In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short-term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (as described herein) may include analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the following are examples, and that the image data may be preprocessed using other kinds of preprocessing methods. In some examples, the image data may be preprocessed by transforming the image data using a transformation function to obtain a transformed image data, and the preprocessed image data may include the transformed image data. For example, the transformed image data may include one or more convolutions of the image data. For example, the transformation function may comprise one or more image filters, such as low-pass filters, high-pass filters, band-pass filters, all-pass filters, and so forth. In some examples, the transformation function may include a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may include information based on and/or related to the extracted edges. In some examples, the image data may be preprocessed to extract image features from the image data. Some non-limiting examples of such image features may comprise information based on and/or related to edges, corners, blobs, ridges, Scale Invariant Feature Transform (SIFT) features, temporal features, and so forth.

In some embodiments, analyzing image data (for example, by the methods, steps and processor functions described herein) may include analyzing the image data and/or the preprocessed image data using one or more rules, functions, procedures, artificial neural networks, object detection algorithms, anatomical detection algorithms, visual event detection algorithms, action detection algorithms, motion detection algorithms, background subtraction algorithms, inference models, and so forth. Some non-limiting examples of such inference models may include an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing image data (for example, by the methods, steps and processor functions described herein) may include analyzing pixels, voxels, point clouds, range data, etc. included in the image data.

Figure 12:
FIG. 12 depicts an illustration of an RGB-D image, consistent with disclosed embodiments.

Nutritional pipeline 100 may receive an RGB-D image 101 as input. An RGB-D image may comprise red, green, blue plus depth (RGB-D) data. RGB-D data may include an image that contains both color and depth information. FIG. 12 depicts an example of an RGB-D image that may be received by nutritional pipeline 100. As depicted in FIG. 12, image 1201 may comprise an RGB image and image 1202 may comprise a depth-map associated with image 1201. RGB-D data may be received from a camera, such as a digital camera, phone camera (e.g., Apple™, Samsung™, or Google™ smartphone camera and sensor), computer camera, or any other device capable of capturing moving or still images. In other embodiments, a camera that does not have the capability to capture depth information may be used in combination with a light detection and ranging ("LiDAR") time-of-flight sensor. The time-of flight sensor may utilize LiDAR to measure distances between the time-of-flight sensor and the subject of the image for each point of the image to capture depth information associated with the image. In such embodiments, the time-of-flight sensor may be used in combination with a camera, such as, for example, an iPhone TrueDepth camera. In some embodiments, the camera and/or the time-of-flight sensor may be mounted to another apparatus. For example, in a hospital environment, the camera and/or time-of-flight sensor may be attached to a tray dolly, which contains one or more trays of hospital food. In such an embodiment, the camera and/or time-of-flight sensor may be configured to automatically or manually capture images of food on the trays (e.g., as they are placed on the tolly, removed from the dolly, etc.). According to some embodiments, the camera and/or time-of-flight sensor may be configured to differentiate between the tray, dishes on the tray, and food items on the dishes, etc., using the techniques described below.

In other embodiments, nutritional pipeline 100 may receive an RGB image as an input. The RGB image may not contain depth information associated with the image. The RGB image may be captured by a camera that does not include a depth sensor capable of capturing depth information. In such an embodiment, nutritional pipeline 100 may use monocular depth estimation to predict the depth information of an object, including food objects, in a single image. Monocular depth estimation may estimate a distance relative to the camera of each pixel in the RGB image using a convolutional neural network. The depth information generated through the monocular depth estimation may be used in combination with the RGB image throughout nutritional pipeline, as disclosed herein.

Nutritional pipeline 100 may further include an image segmentation model 102. RGB-D image 101 may be transmitted as an input to image segmentation model 102. Image segmentation model 102 may divide an image, such as the received RGB-D image 101, into multiple parts or regions based on criteria such as color or texture. In some embodiments, image segmentation model 102 may include techniques such as thresholding, region growing, edge-based segmentation, clustering, watershed segmentation, active contours, growth-based segmentation, or superpixel-based segmentation. In other embodiments, image segmentation model 102 may include deep learning-based segmentation. Deep learning techniques for image segmentation may include applying multiple layers of filters to a received image to extract high-level features. Image segmentation model 102 may identify at least one food item or other item found in the received RGB-D image 101 through deep learning techniques of image segmentation. In other embodiments, a Segment Anything Model (SAM) may be used, such as the SAM of Meta™ or the like. The image segmentation model 102 may segment the RGB-D image 101 into synthetic data using an asset library. The asset library may include a variety of actual and/or synthetic images of discrete food items, constituent elements, or complex combinations (e.g., dishes). As discussed below, the asset library may be linked to a nutritional database 105 containing corresponding data such as calories, fat, protein, vitamins, carbohydrates, etc. Such nutritional data may be organized in the database 105 based on corresponding classifications in the SAM, based on nutritional data per mass or volume of a food item, or in other ways. By segmenting the RGB-D image 101 into images of individual food items, each food item in the RGB-D image 101 may be identified based on a comparison of the segmented images to images from the asset library.

The image segmentation model 102 may be trained using synthetic datasets 103. For example, the synthetic datasets 103 may include example image or video frames of previously identified food items, or other items. Training the image segmentation model 102 with synthetic datasets 103 may include using the synthetic datasets 103 to thereby identify a similar food or other item in one or more image frames. In other words, images or frames of one or more videos that are known to be associated with a particular food or other item may be used to train the image segmentation model 102. The trained image segmentation model 102 may thereafter be used to identify whether one or more received image frames are also associated with the food item or other item. In some embodiments, the disclosed techniques may further include updating the trained image segmentation model 102 based on at least one of the analyzed images or frames. Accordingly, by identifying food items or other items in the obtained images or video frames using computer image analysis, disclosed embodiments may create efficiencies in data processing and image/video classification, reduce costs through automation, and improve accuracy in data classification.

Nutritional pipeline 100 may generate a nutrient estimation 104 of the food items identified in RGB-D image 101. To generate nutrient estimate 104, nutritional pipeline 100 may search a nutritional database 105. The nutritional database 105 may include various nutritional information about a variety of food items. For example, nutritional database 105 may include nutritional information such as the weight, calories, carbohydrates, fiber, fats, proteins, vitamins, minerals, sugars, cholesterol, sodium, daily values, and any other nutritional information that may be associated with a food type. Nutritional database 105 may include nutritional information related to constituent elements of a food item, such as individual ingredients that may make up a larger dish, and nutritional information related to complex combinations of constituent food elements, such as prepared meals including a variety of combined constituent food elements. The food items identified by image segmentation model 102 may be compared to the food items of nutritional database 105 to calculate the weight, calories, and any other nutrient estimations 104 related to the identified food items.

Nutritional pipeline 100 may then generate an intake estimate 106. The intake estimate 106 may be an estimate of the calories and macronutrients included in the food items identified in the RGB-D image 101 based on the volume of the food item. In some embodiments, the intake estimate 106 may include an overall caloric intake estimate. In other embodiments, the intake estimate 106 may include a breakdown of the nutritional value, such as the macronutrients included in identified food items.

Figure 1B:
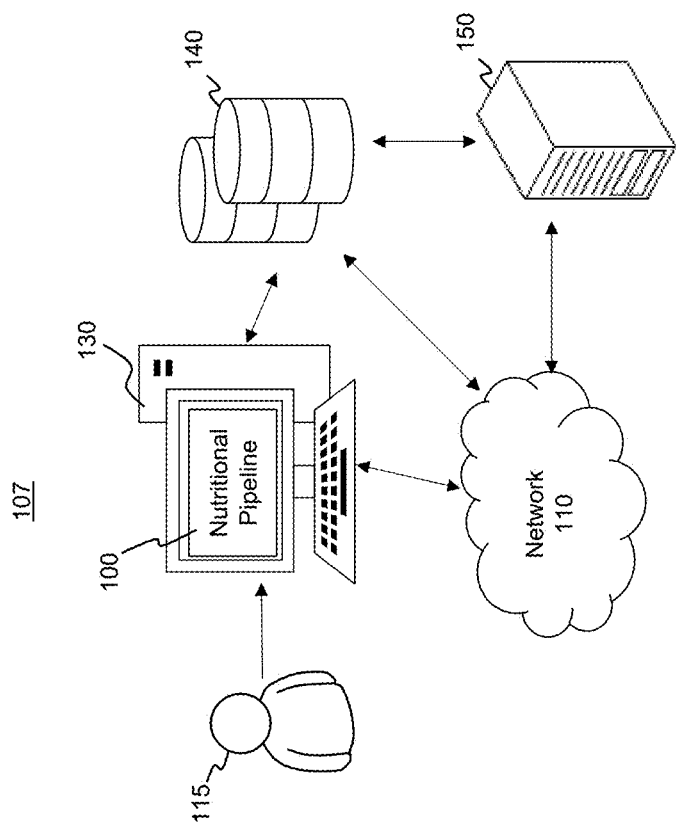
FIG. 1B depicts a system for using an integrated camera to scan food, consistent with disclosed embodiments.

FIG. 1B illustrates a system 107 for using an integrated camera to scan food. System 107 may include one or more nutritional pipelines 100, one or more computing devices 130, one or more databases 140, and one or more servers 150 as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 107 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 115 may develop software code through an Integrated Development Environment (IDE) 132 operated on computing device 130. Computing device 130 may also include an integrated camera that may be configured to capture images or videos, including images or videos of food items.

System 107 may further comprise one or more database(s) 140, for storing and/or executing software. For example, database 140 may be configured to store software or code, such as code developed using computing device 130. Database 140 may further be accessed by computing device 130, server 150, or other components of system 107 for downloading, receiving, processing, editing, or running the stored software or code. Database 140 may be any suitable combination of data storage devices, which may optionally include any type or combination of databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vm Ware™, or other cloud computing providers. Database 140 may include other commercial file sharing services, such as Dropbox™, Google Docs™, or iCloud™. In some embodiments, database 140 may be a remote storage location, such as a network drive or server in communication with network 110. In other embodiments database 140 may also be a local storage device, such as local memory of one or more computing devices (e.g., computing device 130) in a distributed computing environment.

System 107 may also comprise one or more server device(s) 150 in communication with network 110. Server device 150 may manage the various components in system 107. In some embodiments, server device 150 may be configured to process and manage requests between computing devices 130 and/or databases 140. In embodiments where software code is developed within system 107, server device 150 may manage various stages of the development process, for example, by managing communications between computing devices 130 and databases 140 over network 110. Server device 150 may identify updates to code in database 140, may receive updates when new or revised code is entered in database 140, and may participate in identifying food in images in accordance with FIGS. 5-11.

System 107 may also comprise one or more nutritional pipelines 100 in communication with network 110. Nutritional pipeline 100 may be any device, component, program, script, or the like for using an integrated camera to scan food items, as described in more detail below. In some embodiments, nutritional pipeline 100 may be implemented as a separate component within system 107, capable of analyzing software and computer codes or scripts within network 110. In other embodiments, nutritional pipeline 100 may be a program or script and may be executed by another component of system 107 (e.g., integrated into computing device 130, database 140, or server 150). Nutritional pipeline 100 may further comprise an online application installed on computing device 130 to communicate with, for example, other components of system 107 via network 110 and/or a local network. In other embodiments, nutritional pipeline 100 may comprise a web browser software that may communicate via network 110 and/or a local network. Computing device 130 may provide a graphical user interface to enable user 115 to view data from the computing device 130 generated by nutritional pipeline 100.

Nutritional pipeline 100 may further comprise one or more components for performing various operations of the disclosed embodiments. For example, nutritional pipeline 100 may be configured to capture an RGB-D image of the food using the integrated camera or an external camera, input the RGB-D image into an instance detection network configured to detect food items, segment a plurality of food items from the RGB-D image into a plurality of masks, classify a particular food item among the individual food items using a multimodal large language model, estimate a volume of the particular food item by overlaying an RGB image associated with the RGB-D image with a depth-map to create a point cloud, and estimate the calories of the particular food item using the estimated volume and a nutritional database.

Figure 1C:
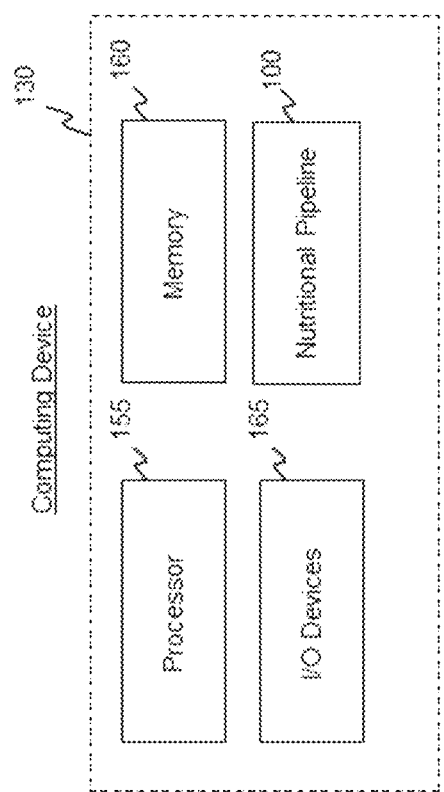
FIG. 1C depicts a block diagram showing a computing device including a nutritional pipeline, consistent with disclosed embodiments.

FIG. 1C is a block diagram showing an exemplary computing device 130 including nutritional pipeline 100 in accordance with disclosed embodiments. Computing device 130 may include a processor 155. Processor (or processors) 155 may include one or more data or software processing devices. For example, the processor 155 may take the form of, but is not limited to, a microprocessor, embedded processor, or the like, or may be integrated in a system on a chip (SoC). Furthermore, according to some embodiments, the processor 155 may be from the family of processors manufactured by Intel®, AMD®, Qualcomm®, Apple®, NVIDIA®, or the like. The processor 155 may also be based on the ARM architecture, a mobile processor, or a graphics processing unit, etc. In some embodiments, nutritional pipeline 100 may be employed as a cloud service, such as a Software as a Service (SaaS) system, a Platform as a Service (PaaS), or Infrastructure as a Service (IaaS) system. For example, nutritional pipeline 100 may be based on infrastructure of services of Amazon Web Services™ (AWS™), Microsoft Azure™, Google Cloud Platform™, Cisco Metapod™, Joyent™, vm Ware™, or other cloud computing providers. The disclosed embodiments are not limited to any type of processor configured in the computing device 130.

Memory (or memories) 160 may include one or more storage devices configured to store instructions or data used by the processor 155 to perform functions related to the disclosed embodiments. Memory 160 may be configured to store software instructions, such as programs, that perform one or more operations when executed by the processor 155 to use an integrated camera to scan food, for example, using methods 500 through 1100, described in detail below. The disclosed embodiments are not limited to software programs or devices configured to perform dedicated tasks. For example, the memory 160 may store a single program, such as a user-level application, that performs the functions of the disclosed embodiments, or may comprise multiple software programs. Additionally, the processor 155 may in some embodiments execute one or more programs (or portions thereof) remotely located from the computing device 130. Furthermore, the memory 160 may include one or more storage devices configured to store data (e.g., machine learning data, training data, algorithms, etc.) for use by the programs, as discussed further below.

Computing device 130 may further include one or more input/output (I/O) devices 165. I/O devices 165 may include one or more network adaptors or communication devices and/or interfaces (e.g., WiFi, Bluetooth®, RFID, NFC, RF, infrared, Ethernet, etc.) to communicate with other machines and devices, such as with other components of system 107 through network 110. In some embodiments, the I/O devices 165 may also comprise a touchscreen configured to allow a user to interact with nutritional pipeline 100 and/or an associated computing device. The I/O device 165 may comprise a keyboard, mouse, trackball, touch pad, stylus, and the like.

Figure 2:
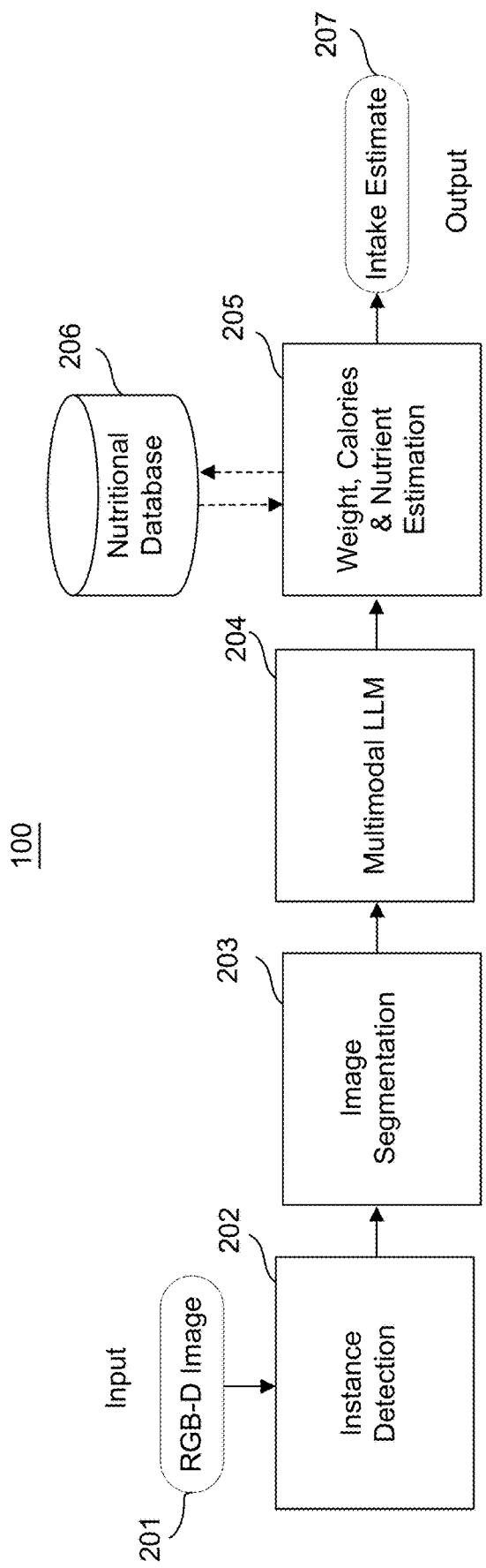
FIG. 2 depicts a process for estimating nutritional data using a multimodal large language model, consistent with disclosed embodiments.

FIG. 2 depicts another embodiment of nutritional pipeline 100 for estimating nutritional data using a multimodal large language model, in accordance with disclosed embodiments. An RGB-D image 201 may be received by nutritional pipeline 100. RGB-D image 201 may correspond to RGB-D image 101, as disclosed herein with respect to FIG. 1A. RGB-D image 201 may include an image that contains both color and depth information. RGB-D image 201 may be received from a camera, such as a digital camera, phone camera (e.g., Apple™, Samsung™, or Google™ smartphone camera and sensor), computer camera, or any other device capable of capturing moving or still images. In some embodiments, an RGB-D image may be received from a camera used in combination with a time-of-flight sensor, as disclosed herein with respect to FIG. 1A. In other embodiments, an RGB image, which may not contain depth information, may be received by nutritional pipeline 100. Nutritional pipeline 100 may perform a monocular depth estimation to calculate a depth map associated with the image, as disclosed herein with respect to FIG. 1A.

RGB-D image 201 may be input into an instance detection model 202. The instance detection model 202 may comprise a deep-learning model that may identify and locate objects in an image. For example, the instance detection model 202 may be trained to detect the presence and location of specific objects, such as food items. In some embodiments, the instance detection model 202 may comprise a convolutional neural network, such as R-CNN, Fast R-CNN, Ultralytics™ YOLOv8, or any other instance detection model suitable for identifying objects in an image. In such embodiments, the instance detection model 202 may include a two-stage network or a single-stage network. In the first stage of a two-stage network, the instance detection model may identify subset regions of the received image that might contain an object. In the second stage of a two-stage network, the instance detection model may then classify the objects within the subset regions. In a single stage network, the instance detection model may produce a network prediction for regions across the entire image using anchor boxes. The predictions may be decoded to generate a final bounding box for the identified objects. In other embodiments, the instance detection model 202 may include a machine learning based model. For example, a machine learning-based instance detection model may identify groups of pixels that may belong to an object and feed the groups into a regression model to predict the location and label of the object in an image. The output of the instance detection model 202 may include bounding boxes and associated labels around the identified objects in the received RGB-D image 201.

Figure 15:
FIG. 15 depicts an illustration of segmenting a plurality of food items from an RGB-D image into a plurality of masks, consistent with disclosed embodiments.
Figure 15:
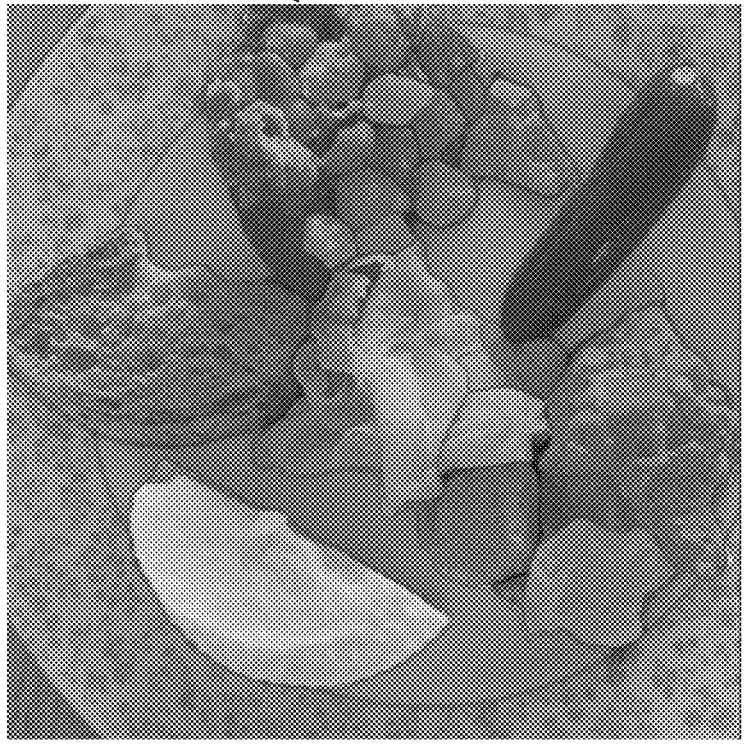

The RGB-D image 201, including the bounding boxes generated by instance detection model 202, may be input into an image segmentation model 203. The image segmentation model 203 may comprise a deep-learning model that may predict and generate exact pixel boundaries of individual object instances in an image. The image segmentation model 203 may generate a more detailed output than the output of the instance detection model 202 by categorizing each pixel of an image by a semantic class. For example, the instance detection model 203 may generate a pixel-by-pixel segmentation mask of a precise shape and location of each instance of an object in the RGB-D image 201. In some embodiments, the image segmentation model 203 may comprise a machine analysis model such as Segment Anything Model (SAM), OneFormer, FastSAM, YOLOACT, or any other machine analysis model suitable for generating a segmentation mask based on a received image or frame. In some embodiments, nutritional pipeline 100 may include a pre-analysis stage which may run a classifier (e.g., a neural network classifier) to determine a class associated with each of the segment masks. The class may be an object class indicating a type of object, such as different types of food items, associated with the respective segment mask. The output of the image segmentation model 203 may include classified segmentation masks associated with each identified food item in the received RGB-D image 201. FIG. 15 depicts an example of a segmented image. For example, image 1501 may comprise an RGB-D image of a group of food items. Image 1502 may comprise a segmented image with each food item segmented with a separate segmentation mask.

Figure 16:
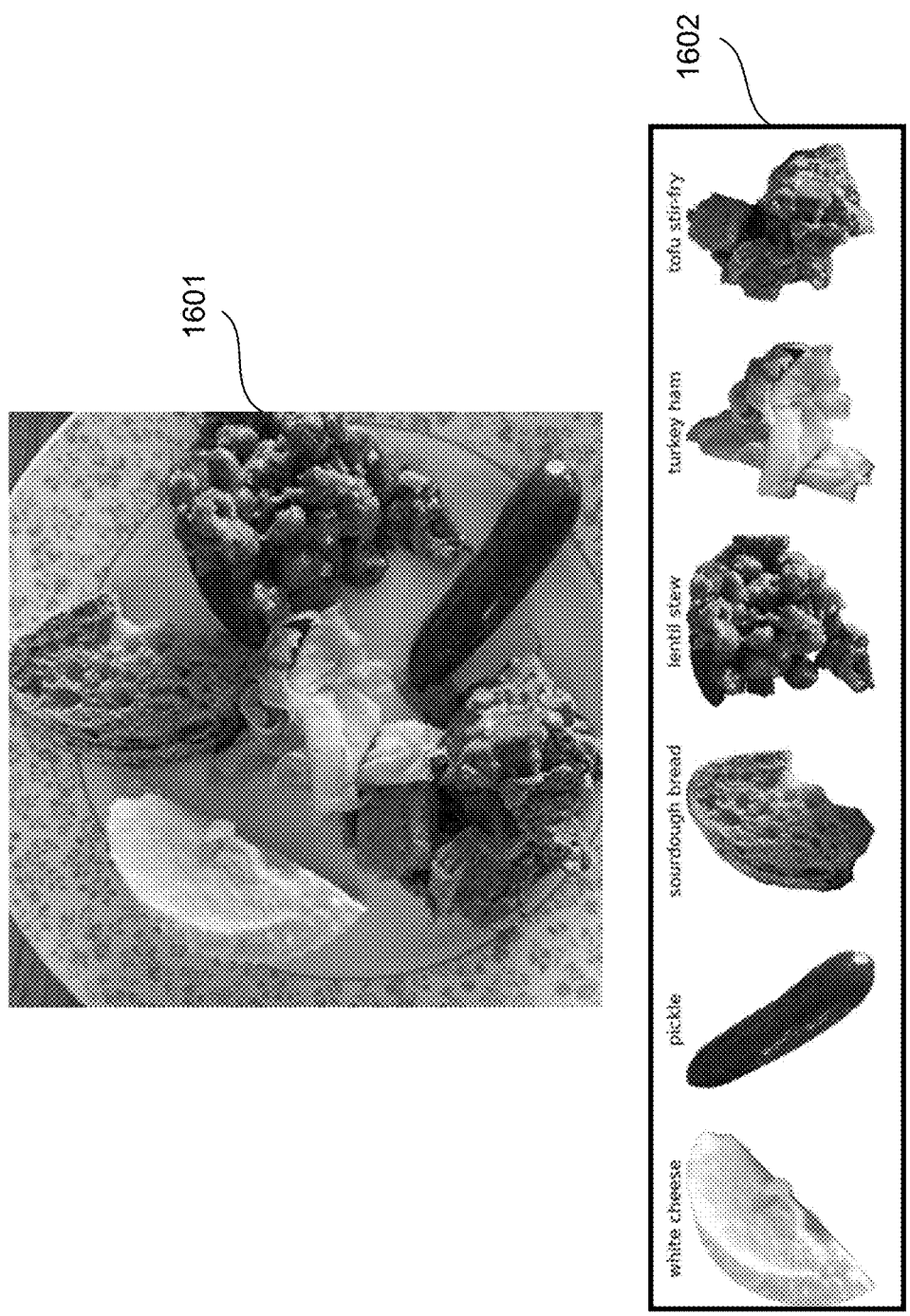
FIG. 16 depicts an illustration of classifying particular food items, consistent with disclosed embodiments.

The segmented RGB-D image 201 may be transmitted to a multimodal large language model 204 as input. The multimodal large language model 204 may include a large language model that may receive visual, auditory, textual, and other formats of information of input. The multimodal large language model may be trained on several data types, such as auditory, visual, and textual data formats. The multimodal large language model 204 may analyze the segmentation masks of the segmented RGB-D image to classify the food items. The output of the multimodal large language model 204 may include a classification and label of each of the types of foods in the RGB-D image 201. FIG. 16 depicts an example of an output of a multimodal large language model analyzing an RGB-D image of food items. As depicted in FIG. 16, an original RGB-D image 1601 of a plurality of food items may be received from an integrated camera. The multimodal large language model may classify each of the food items in the original RGB-D image 1601, as disclosed herein. The multimodal large language model may generate a classification label 1602 of each of the identified food items.

The identified food types of the RGB-D image 201 may be analyzed for a nutrition information estimation 205. Nutrient estimation 205 may correspond to nutrient estimation 104, as disclosed herein with respect to FIG. 1A. The nutrient estimation 205 of the identified food types of the RGB-D image 201 may be retrieved from a nutritional database 206. Nutritional database 206 may correspond to nutritional database 105, as disclosed herein with respect to FIG. 1. An intake estimate 207 may be generated based on the nutrient estimation 205 of the identified food types of the RGB-D image 201. The intake estimate 207 may correspond to the intake estimate 106, as disclosed herein with respect to FIG. 1A.

In some embodiments, the nutrient estimation 205 may also involve estimating a mass or volume of the food items being analyzed. For example, estimating the mass or volume of food items may include performing a dimensional (e.g., cross-section, perimeter, depth, area, etc.) measurement of the food item being analyzed. In other embodiments, the multimodal LLM 204 itself may estimate the mass or volume of the food items being analyzed. Further techniques for estimating a mass or volume of food are discussed below, for example in connection with the disclosed point cloud and depth-map techniques.

Figure 3:
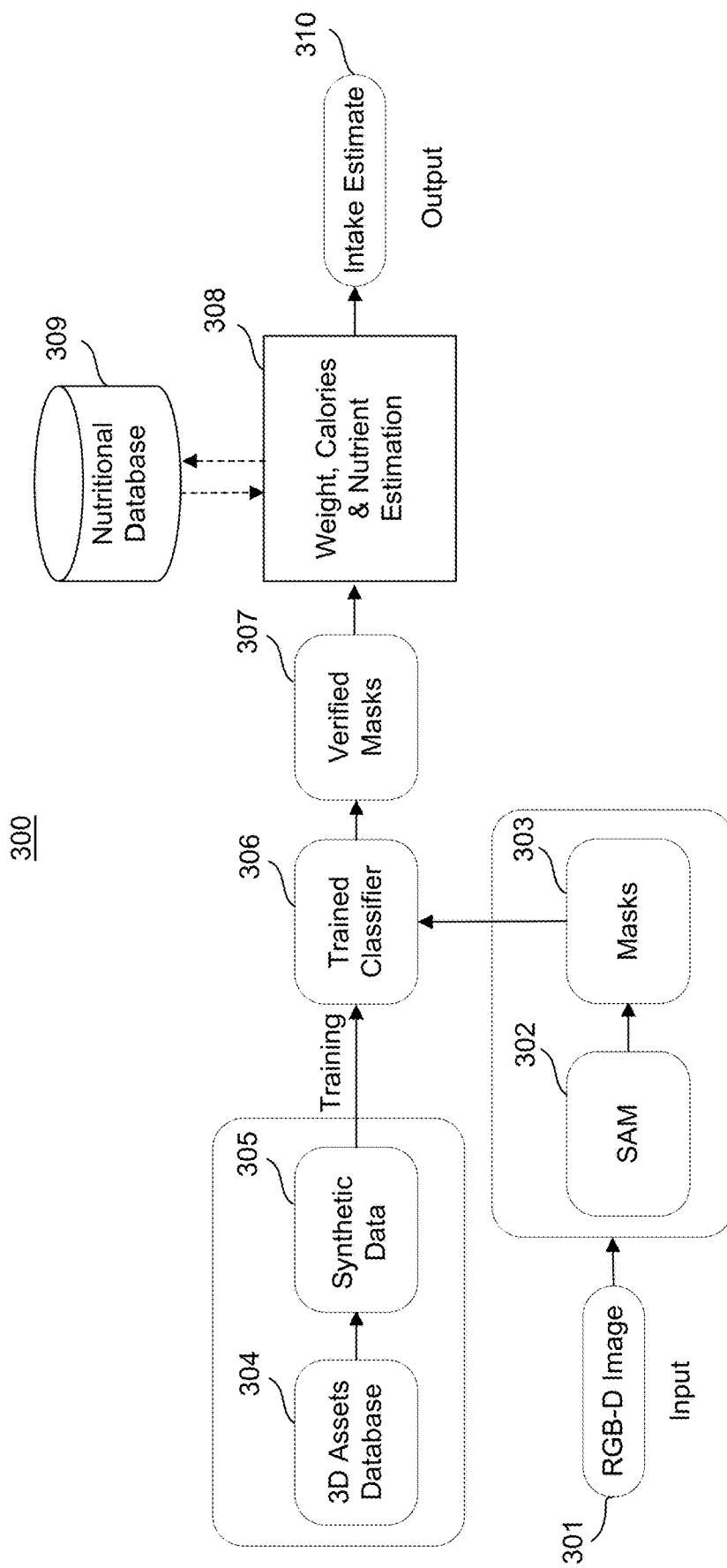
FIG. 3 depicts a process for estimating nutritional data using synthetic data and large multipurpose models for segmentation, consistent with disclosed embodiments.

FIG. 3 depicts an exemplary system 300 for training a classifier and estimating nutritional data using a nutritional pipeline. Training the classifier 306 may comprise generating synthetic data 305 through a data generation loop via a 3D assets database 304. 3D assets may comprise digital files that represent objects or elements in three-dimensional space. 3D assets may comprise data that may define a shape, texture, and appearance of three-dimensional objects. The 3D assets database 304 may comprise a database compiling multiple digital files representing examples of varieties of individual food items. For example, the 3D assets database 304 may contain a plurality of photographs, frames, or other digital files of individual food items. For example, 3D assets database 304 may contain digital files of individual food items in differing lighting conditions, with differing combinations of other food items, and in differing physical environments. Storing a variety of images of each individual food item in 3D assets database 304 may increase the accuracy of system 300 by allowing system 300 to recognize food items across varying environmental conditions.

Figure 14:
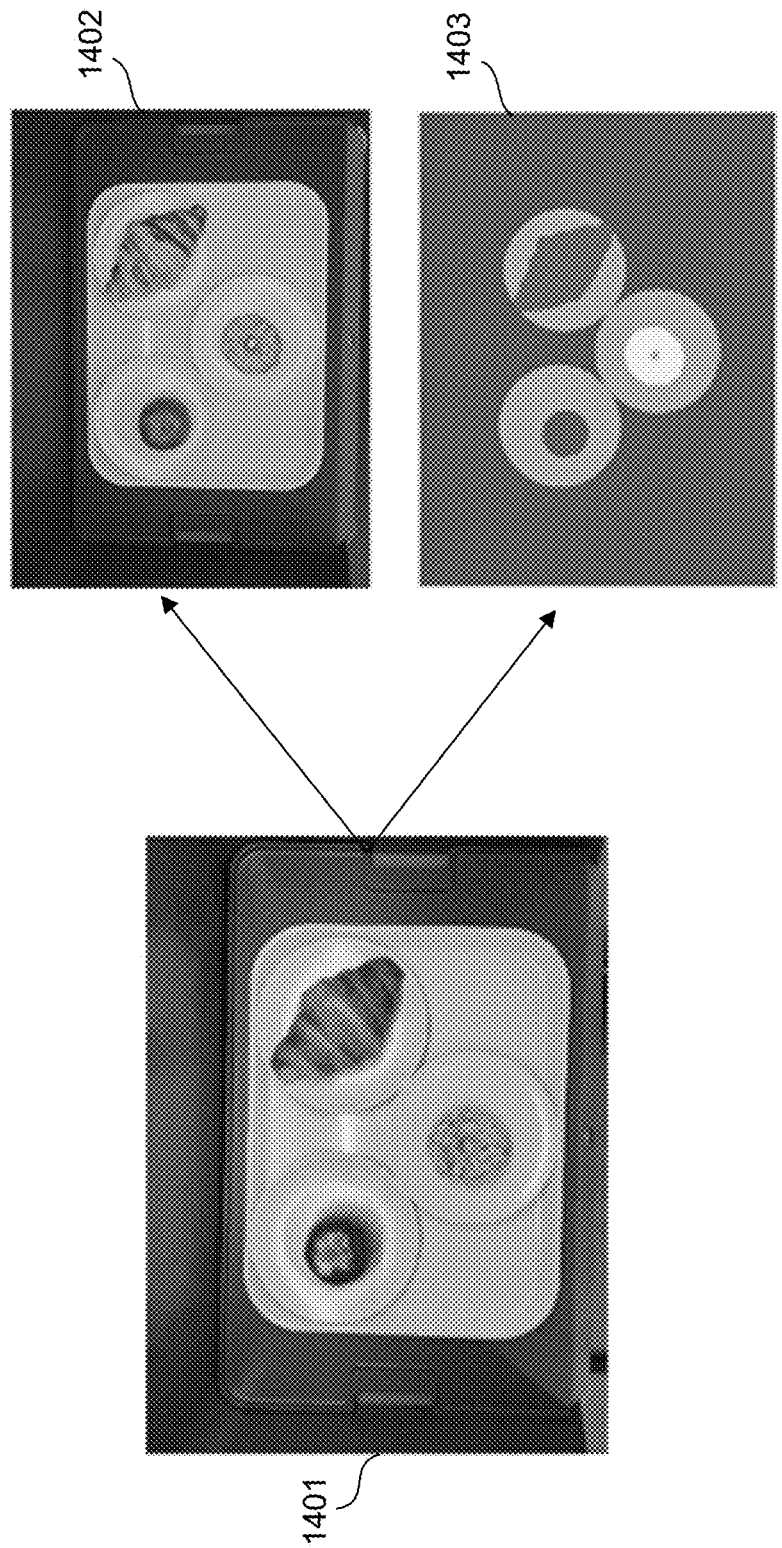
FIG. 14 depicts an illustration of generating synthetic images, consistent with disclosed embodiments.

Synthetic data 305 may be generated for use in training classifier 306. Synthetic data 305 may include computer-generated data that mimics real-world data, such as images of real-world food items. Synthetic data 305 may be generated based on generative artificial intelligence. FIG. 14 depicts an example of generated synthetic data for use in training classifier 306. For example, an actual image 1401 may be collected from an integrated camera. Synthetic data 1402 and 1403 may be generated for use in training classifier 306. For example, synthetic data 305 may be generated through a data generation loop with 3D assets database 304. Synthetic data 305 may be stored in 3D asset database 304 to increase the varieties of conditions in which a food item may be photographed. Synthetic data 305 may be used to train classifier 306. For example, classifier 306 may receive the synthetic data 305 as input and identify one or more food items in the synthetic data 305 as an output.

System 300 may further include receiving an RGB-D image 301 as an input. An RGB-D image 301 may be received from a camera of a user and may include one or more food items. The RGB-D image 301 may be transmitted as input in an image segmentation model 302. The image segmentation model 302 may predict and generate exact pixel boundaries of individual object instances in the received RGB-D image 301. For example, the image segmentation model 302 may generate a pixel-by-pixel segmentation mask of a precise shape and location of each instance of an object in the RGB-D image 301. The output of the image segmentation model 303 may include classified segmentation masks 303 associated with each identified food item in the received RGB-D image 301. The classified segmentation masks 303 may include a specific portion of the RGB-D image 301 that is isolated from the rest of the RGB-D image 301. For example, the classified segmentation masks 303 may correspond to individual food items found in the RGB-D image 301.

The classified segmentation masks 303 may be transmitted as input to the classifier 306. The classifier 306 may identify the food items in each mask 303. For example, classifier 306 may analyze the received mask 303 of a food item to identify and label the food item represented by mask 303. Classifier 306 may output a verified mask 307 which may include the labeled classification of the food item. The nutrient information 308 of the food item of verified mask 307 may be calculated by system 300. For example, system 300 may compare the verified mask 307 with data stored in the nutritional database 309. System 300 may identify the food item of verified mask 307 in nutritional database 309 and collect the nutritional information of the food item of verified mask 307 from nutritional database 309. The nutrition information 308 may include a weight or volume of the food item, calories associated with the food item, or any other nutritional information associated with the food item. System 300 may output an intake estimate 310 based on the nutrition information 308. For example, system 300 may identify a plurality of food items in RGB-D image 301 and may compile the nutrition information of each of the plurality of food items as an intake estimate 310. The intake estimate 310 may comprise a total nutritional estimate of the food items identified in the RGB-D image 301.

Figure 4:
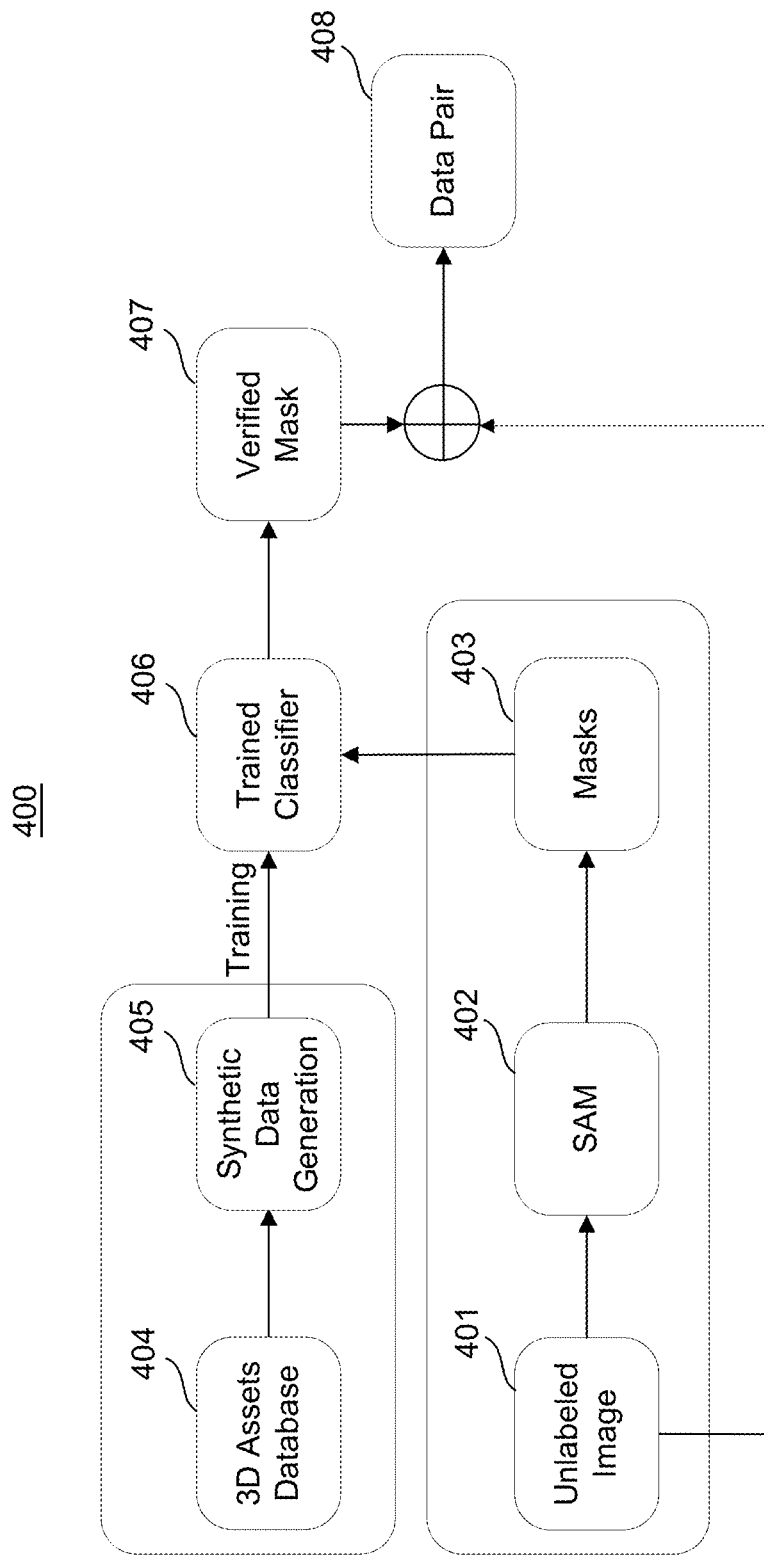
FIG. 4 depicts a process for training a classifier on synthetic data, consistent with disclosed embodiments.

FIG. 4 depicts a system 400 for automatically identifying and annotating food items in an image, consistent with disclosed embodiments. 3D asset database 404 may correspond to 3D asset database 304, as disclosed herein with respect to FIG. 3. For example, 3D asset database 404 may store data files representing food items in a plurality of environmental conditions. Synthetic data 405 may correspond to synthetic data 305, as disclosed herein with respect to FIG. 3. For example, synthetic data 405 may be generated through a data generation loop with 3D assets database 404. Synthetic data 405 may be stored in 3D asset database 404 to increase the varieties of conditions in which a food item may be photographed. Synthetic data 405 may be used to train classifier 406. For example, classifier 406 may receive the synthetic data 405 as input and identify one or more food items in the synthetic data 405 as an output.

An unlabeled image 401 may be received as input in system 400. The unlabeled image 401 may contain one or more food items. The unlabeled image 401 may be transmitted as input to an image segmentation model 402. The image segmentation model 402 may correspond to the image segmentation model 302, as disclosed herein with respect to FIG. 3. For example, image segmentation model 402 may generate a pixel-by-pixel segmentation mask of a precise shape and location of each instance of an object in the unlabeled image 401. The output of the image segmentation model 303 may include classified segmentation masks 403 associated with each identified food item in the received RGB-D image 401. The classified segmentation masks 403 may include a specific portion of the RGB-D image 401 that is isolated from the rest of the RGB-D image 401. For example, the classified segmentation masks 403 may correspond to food items found in the RGB-D image 401.

The segmentation masks 403 may be transmitted as input to classifier 406. Classifier 406 may analyze the segmentation masks 403 to identify the food item of each received segmentation mask 403. The classifier 406 may generate as output a verified mask 407. The verified mask 407 may include a label of the food item found in segmentation mask 403. The verified mask 407 comprising the label of the food item and the unlabeled image 401 may be combined into a data pair 408. Data pair 408 may comprise a labeled image. For example, the data pair 408 may include the unlabeled image 401 combined with the produced label of the verified mask 407. The data pair 408 may be stored in 3D asset database 404 as additional data for training classifier 406.

System 400 may provide a faster, more efficient process of identifying and annotating images containing food items than manual annotation.

Figure 5:
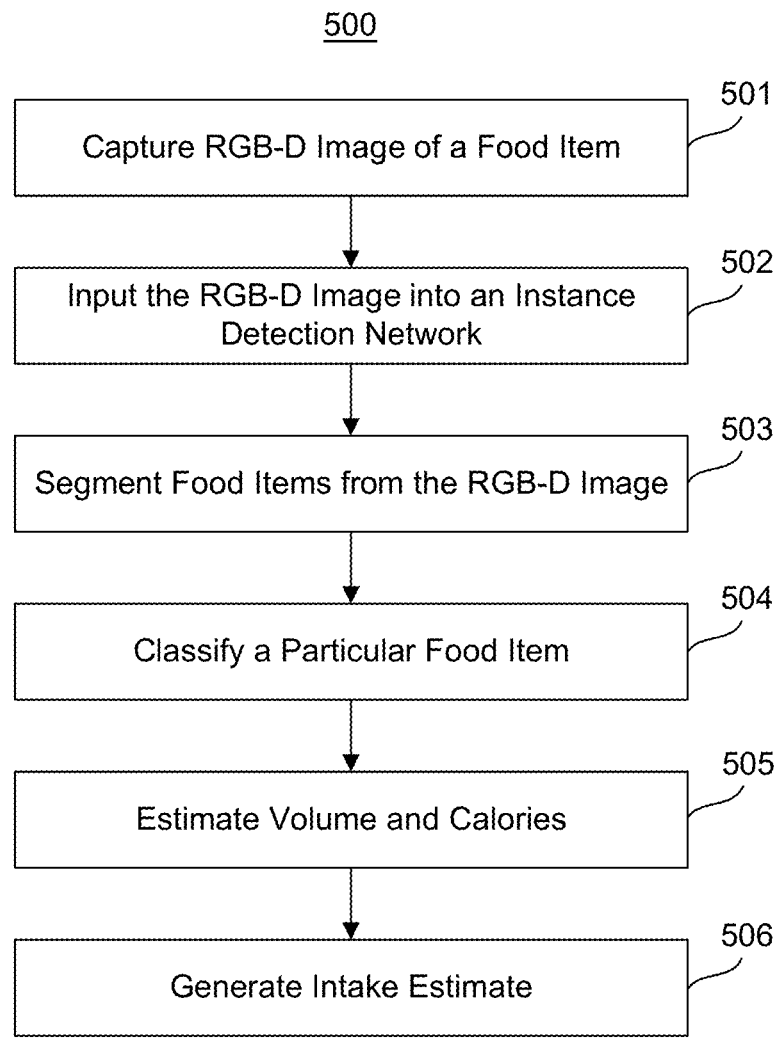
FIG. 5 depicts a flow chart of a process for sensory analysis of images, consistent with disclosed embodiments.

FIG. 5 depicts a flow chart of an exemplary process 500 for sensory analysis of images, consistent with disclosed embodiments. Step 501 of process 500 may include capturing an RGB-D image of a food item. An RGB-D image of a food item may be captured, as discussed above, using an integrated camera, such as a digital camera, phone camera (e.g., Apple™, Samsung™, or Google™ smartphone camera and sensor), computer camera, or any other device capable of capturing moving or still images. In some embodiments, an RGB-D image may be captured from a camera used in combination with a time-of-flight sensor, as disclosed herein with respect to FIG. 1A. For example, a user, such as user 115 may capture an image of a food item using an integrated camera of computing device 130. The RGB-D image of the food item may include both color and depth information. In other embodiments, process 500 may include capturing an RGB image, which may not contain depth information. Process 500 may perform a monocular depth estimation to calculate a depth map associated with the RGB image, as disclosed herein with respect to FIG. 1A.

At step 502 of process 500, the RGB-D image may be transmitted as input into an instance detection network configured to detect food items. Step 502 of process 500 may correspond to the instance detection model 202, as disclosed herein with respect to FIG. 2. For example, the instance detection network may comprise a deep-learning model that may identify and locate objects in an image. The instance detection network may be trained to detect the presence and location of specific objects, such as food items. For example, in some embodiments, the instance detection network may be trained on a plurality of reference food items using a neural network. The instance detection network may be trained in accordance with systems 300 and 400, as disclosed herein with respect to FIGS. 3 and 4. In some embodiments, the instance detection network may comprise a convolutional neural network, such as R-CNN, Fast R-CNN, Ultralytics™ YOLOv8, or any other instance detection network suitable for identifying objects in an image. In other embodiments, the instance detection network may include a machine learning-based model. The output of the instance detection network may include bounding boxes and associated labels around the identified objects in the received RGB-D image. In some embodiments, inputting the RGB-D image into the instance detection network may comprise creating a square around the individual food item. For example, the bounding box generated by the instance detection network may comprise a square located around the identified individual food items.

Step 503 of process 500 may include segmenting a plurality of food items from the RGB-D image into a plurality of masks. Step 503 of process 500 may correspond to the image segmentation model 203, as disclosed herein with respect to FIG. 2. For example, the image segmentation model may comprise a deep-learning model that may predict and generate exact pixel boundaries of individual object instances in an image. The image segmentation model may generate a more detailed output than the output of the instance detection model of step 502 by categorizing each pixel of an image by a semantic class. For example, the instance detection model may generate a pixel-by-pixel segmentation mask of a precise shape and location of each instance of an object in the image. The image segmentation model may generate classified segmentation masks that represent individual food items found in the received RGB-D image.

Step 504 of process 500 may include classifying a particular food item among the identified individual food items using a multimodal large language model. Step 504 of process 500 may correspond to the multimodal large language model 204, as disclosed herein with respect to FIG. 2. The multimodal large language model of step 504 may include a large language model that may receive visual, auditory, textual, and other formats of information as input. The multimodal large language model may be trained on several data types, such as auditory, visual, and textual data formats. At step 504 of process 500, the segmented RGB-D image and masks may be transmitted to the multimodal large language model as an input. The multimodal large language model may analyze the mask to classify the food items identified in step 503 of process 500. The output of the multimodal large language model of step 504 may include a classification and label of each of the types of foods in the RGB-D image.

Figure 13:
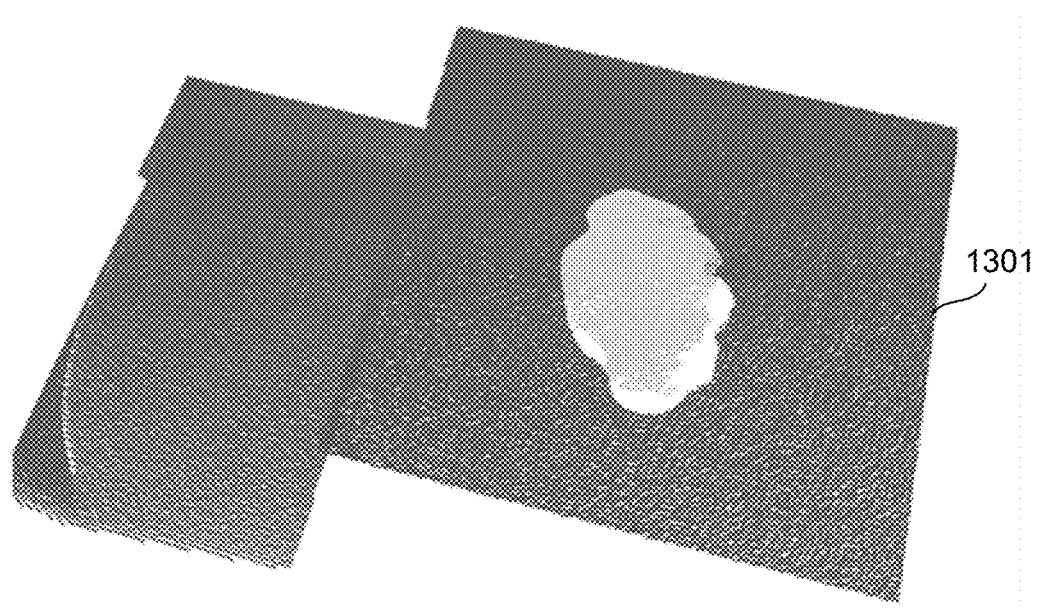
FIG. 13 depicts an illustration of a synthetic point cloud, consistent with disclosed embodiments.

Step 505 of process 500 may include estimating a volume of the particular food item by overlaying an RGB image associated with the RGB-D image with a depth-map to create a point cloud. A depth map may comprise an image that contains information relating to the distance of the surfaces of the object in the image from a defined viewpoint. For example, each pixel of the food item in the RGB-D image may be assigned a value to represent a distance of that pixel from the specified viewpoint to create a three-dimensional representation of the food item. In some embodiments, the depth map may be created using a monocular depth estimation. In such embodiments, monocular depth estimation may comprise estimating a depth value of each pixel of the RGB image given a single RGB image. A point cloud may include a discrete set of data points in space. In some embodiments, the point cloud may be a synthetic point cloud capable of being captured and stored for analysis. For example, the discrete set of data points may represent a three-dimensional shape or object, such as a food item. FIG. 13 depicts an example of a generated point cloud 1301. Point cloud 1301 may comprise a group of three-dimensional points representing an object, such as a food item. The point cloud may be stored in a database as a dataset and may be used for training and analysis. The depth-map may be generated to correspond to the particular food item in the RGB-D image by determining distances of the surfaces of the food item in the RGB-D image from a specified viewpoint. The depth-map of the food item may be used to generate a point cloud representing the identified food item in a three-dimensional space. The volume of the food item may be calculated based on the point cloud.

Step 506 of process 500 may include estimating the calories of the particular food item using the estimated volume and a nutritional database. The nutritional information of the food item may be retrieved from the nutritional database, which may correspond to nutritional database 309, as disclosed herein with respect to FIG. 3. For example, the food item classification determined in step 504 of process 500 may be used to retrieve corresponding nutritional information from the nutritional database. The nutritional information of a specified unit of the food item may be combined with the volume of the food item identified in the RGB-D image to calculate the calories of the food item identified in the RGB-D image.

In some embodiments, process 500 may further include comparing a first RGB-D image before intake to a second RGB-D image after intake, and generating an intake estimate associated with the particular food item. In such an embodiment, process 500 may be completed in parallel between a first RGB-D image taken before consumption of the food item and a second RGB-D image taken after consumption (of all or part) of the food item. The estimated volume of the food item in the first RGB-D image may be higher than the estimated volume of the food item in the second RGB-D image. The intake estimate associated with the particular food item may be generated by subtracting the intake estimate of the second RGB-D image from the intake estimate of the first RGB-D image. The intake estimate associated with the particular food item may comprise a volume, caloric, or nutritional estimate of how much of the particular food item the user ate. In other embodiments, process 500 may further include comparing a first RGB-D image after intake to a synthetic image. A synthetic image may be a computer-generated image that may represent a specific food item after intake. The RGB-D image taken after intake may be compared to the synthetic image to determine if an adequate amount of the food item has been consumed by the user.

In some embodiments, process 500 may further include pairing an unlabeled image with a verified mask from the plurality of masks representing an individual food item to optimize a trained classifier. Pairing an unlabeled image with a verified mask may correspond to the process of system 400 for automatically identifying and annotating food items in an image, as disclosed herein with respect to FIG. 4. For example, an image may contain an unlabeled food item. The system may generate a mask of the individual food item in the image in accordance with steps 502 and 503 of process 500. The system may then classify the food item based on the mask in accordance with step 504 of process 500. The classification of the food item may be paired with the mask to generate a verified pair. The verified pair may be used in training the classifier.

Figure 6:
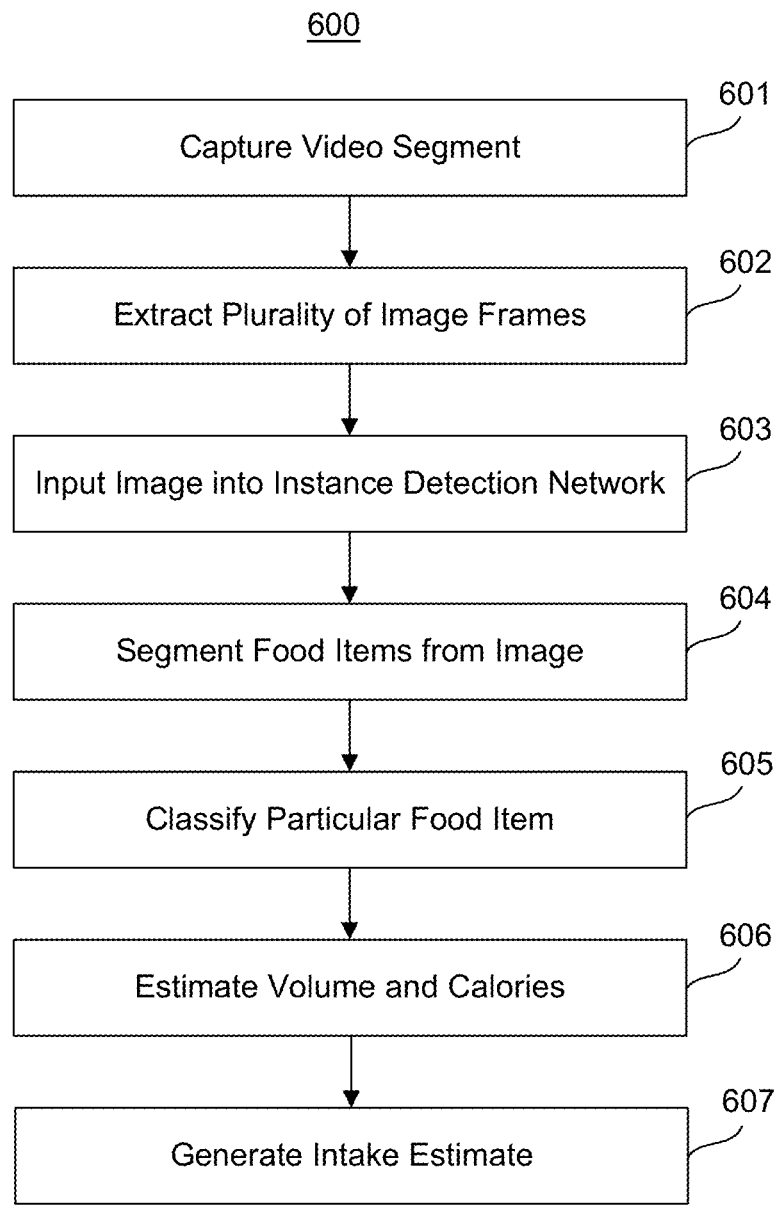
FIG. 6 depicts a flow chart of a process for sensory analysis of video segments, consistent with disclosed embodiments.

FIG. 6 depicts a flow chart of a process 600 for sensory analysis of images, consistent with disclosed embodiments. Step 601 of process 600 may include capturing a video segment of a food item. A video segment of a food item may be captured using an integrated camera, such as a digital camera, phone camera (e.g., Apple™, Samsung™, or Google™ smartphone camera and sensor), computer camera, or any other device capable of capturing moving or still images. For example, a user, such as user 115 may capture a video segment of a food item using an integrated camera of computing device 130. The video segment may comprise a plurality of image frames of an object, such as a food item.

Step 602 of process 600 may comprise extracting a plurality of image frames from the video segment. The system executing process 600 may identify a still frame from the video segment that captures the food item with the clearest camera quality. For example, some of the frames of the video segment may be blurry, may have poor lighting or other environmental conditions, or may not capture the entire food item. Other frames of the video segment may capture a clear image of the entire food item with high quality lighting and environmental conditions. The system may identify which image frames from the video segment may most clearly represent the food item. In some embodiments, step 602 may include extracting one image frame from the video segment. In other embodiments, step 602 may include extracting a plurality of image frames from the video segment. Steps 603, 604, 605, 606, and 607 of process 600 may correspond to steps 502, 503, 504, 505, and 506 of process 500, respectively, as disclosed herein with respect to FIG. 5.

Figure 7:
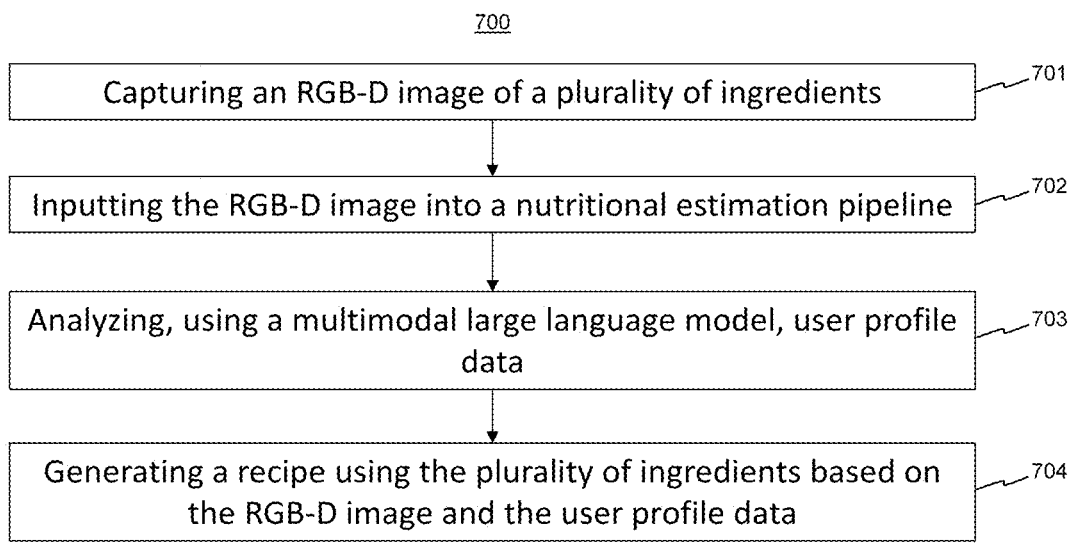
FIG. 7 depicts a flow chart of a process for using an integrated camera to scan food, consistent with disclosed embodiments.

FIG. 7 depicts a flow chart of a process 700 for using an integrated camera to scan food. Step 701 of process 700 may include capturing an RGB-D image of a plurality of ingredients. In some embodiments, a user, such as user 115 may capture a single RGB-D image containing a plurality of ingredients in the RGB-D image. In other embodiments, user 115 may capture a plurality of RGB-D images, each containing one or more ingredient items. The RGB-D image may be captured using an integrated camera of computing device 130 or another (e.g., external) camera. In some embodiments, an RGB-D image may be received from a camera used in combination with a time-of-flight sensor, as disclosed herein with respect to FIG. 1A. In some embodiments, user 115 may capture an RGB image, which may not contain depth information. In such embodiments, process 700 may include performing a monocular depth estimation to calculate a depth map associated with the RGB image, as disclosed herein with respect to FIG. 1A.

Step 702 of process 700 may include inputting the RGB-D image into a nutritional estimation pipeline, such as nutritional pipeline 100, as disclosed herein with respect to FIGS. 1A and 2. For example, the RGB-D image may be transmitted as input into an instance detection network and an image segmentation model to generate segmentation masks of identified food items in the RGB-D image. The generated segmentation masks may correspond to each of the identified ingredients found in the one or more RGB-D images. The nutritional estimation pipeline may further classify each of the identified ingredients based on the segmentation masks. The nutritional information of each of the classified ingredients may be retrieved from a nutritional database.

Step 703 of process 700 may include analyzing, using a multimodal large language model, user profile data. A user, such as user 115 may create a profile that identifies personal information about the user. For example, the user profile may include an intake log, an outtake log, dietary choices, allergies, height, weight, age, and any other information that may relate to nutritional goals, requirements, and choices. A multimodal large language model may analyze the user profile to identify specific user requirements and choices associated with the user profile.

Step 704 of process 700 may include generating a recipe using the plurality of ingredients based on the RGB-D image and the user profile data. For example, a recipe may be generated by searching a database of recipes based on the ingredients identified in the RGB-D image and the user profile data. The recipe may include ingredients identified in the RGB-D image and may also meet the user requirements for recipes identified in the user profile data.

Figure 8:
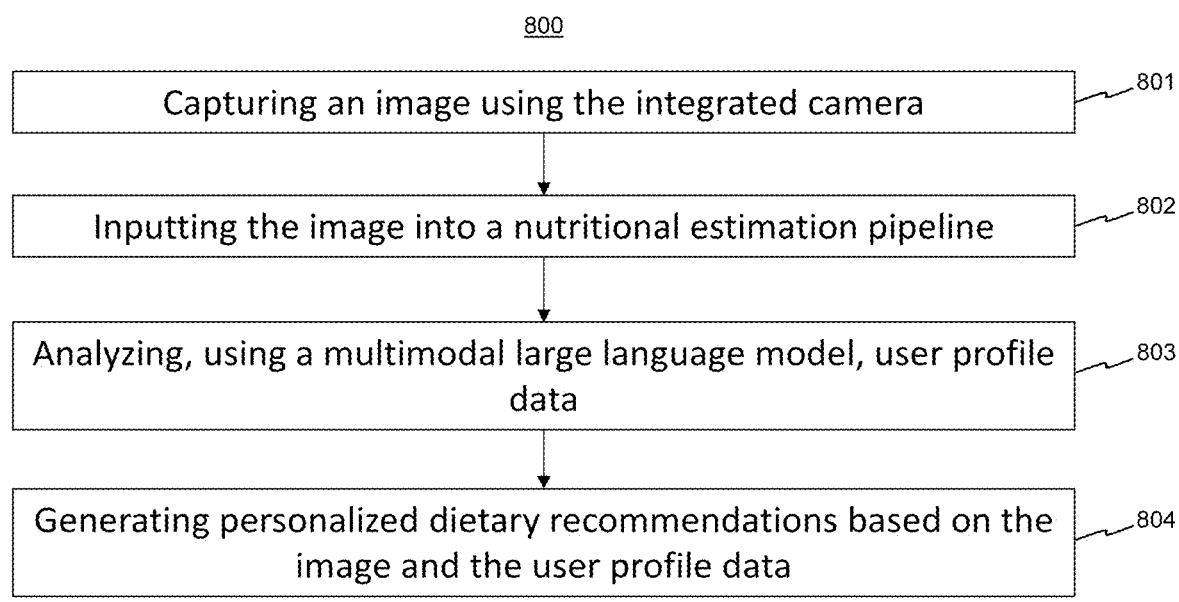
FIG. 8 depicts a flow chart of a process for using an integrated camera to scan food, consistent with disclosed embodiments.

FIG. 8 depicts a flow chart of a process 800 for using an integrated camera or other camera to scan food. Step 801, 802, and 803 of process 800 may correspond to steps 701, 702, and 703 of process 700, respectively, as disclosed herein with respect to FIG. 7. Step 804 of process 800 may include generating personalized dietary recommendations based on the image and the user profile data. For example, in some embodiments, a personalized dietary recommendation may include a recommendation that a food item identified in the image contains an ingredient that the user is allergic to. In other embodiments, the personalized dietary recommendation may include a recommendation related to a specific medical diet of the user, such as a diet related to diabetes, prenatal nutrition, infant feeding, or any other specialized medical diet. In other embodiments, the personalized dietary recommendation may comprise a recommended portion size of the food item identified in the image. In other embodiments, personalized dietary recommendations may include nutritional information about the food item identified in the image.

Figure 9:
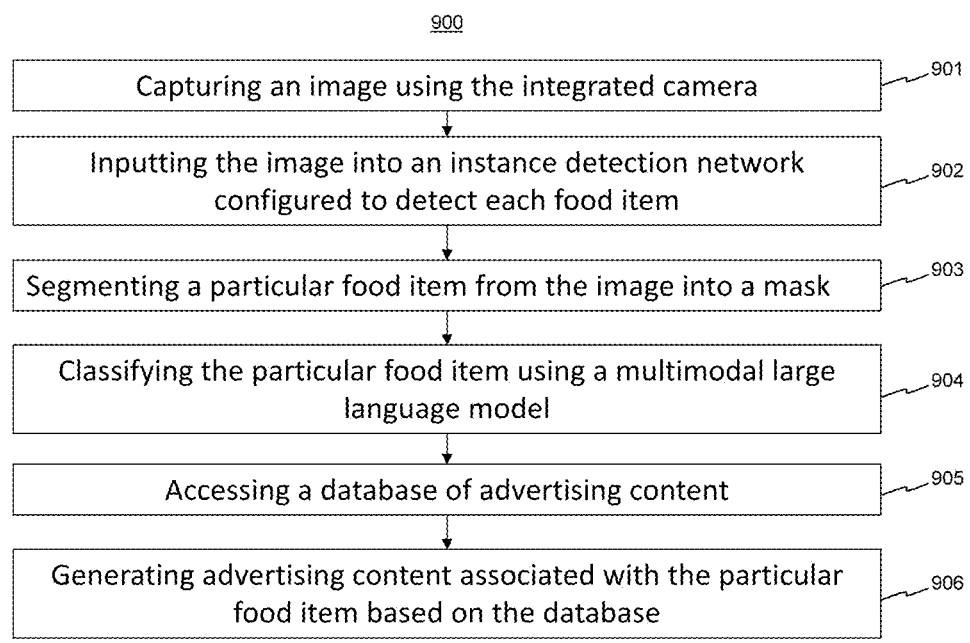
FIG. 9 depicts a flow chart of a process for generating advertising content based on a scanned food, consistent with disclosed embodiments.

FIG. 9 depicts a flow chart of a process 900 for generating advertising content based on a scanned food item. Steps 901, 902, 903, and 904 of process 900 may correspond to steps 501, 502, 503, and 504 of process 500, respectively, as disclosed herein with respect to FIG. 5. Step 905 may comprise accessing a database, such as database 140, containing advertising content. For example, the database may contain a plurality of advertisements of products or services from third parties. Such advertisements may include advertisements related to food products, cooking products, restaurants, grocery stores, or any other products or services. Advertisements stored in the advertisement database may include social media advertisements, display advertisements, video advertisements, print advertisements, or advertisements in any other format.

Step 906 of process 900 may include generating advertising content associated with the particular food item based on the database. Generating advertising content may comprise retrieving one or more advertisement from the advertisement database or communicating with an advertisement supplier. For example, the system may search the advertising database for relevant advertising content based on the classified food item identified in the image, or may provide advertising parameters (e.g., type of food, demographics, location, etc.) to an advertising network for selection of a targeted advertisement. Generating advertising content may further comprise displaying an advertisement to a user, for example by displaying the advertising content on a graphical user interface of a user device, such as computing device 130. Further, the advertisement may come from a third-party in some situations, such as from an advertisement network, a host server, an edge server, etc. In some embodiments, the advertising content may be associated with a seller of the food item identified in the image through steps 901-904. In other embodiments, the advertising content may be related to a food item similar to the food item identified in the image. In other embodiments, the advertising content may be based on a geographic location of the user, a user profile, past food detected for the user, etc.

Figure 10:
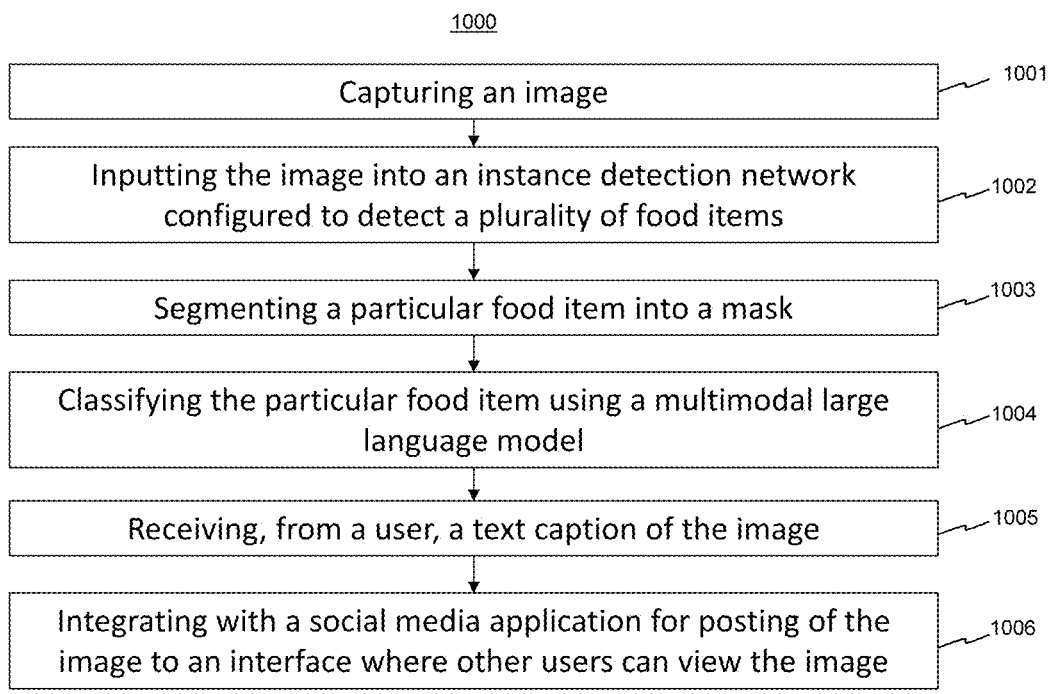
FIG. 10 depicts a flowchart of a process for sharing a scanned food item over social media, consistent with disclosed embodiments.

FIG. 10 depicts a flowchart of a process 1000 for sharing a scanned food item over social media. Steps 1001, 1002, 1003, and 1004 of process 1000 may correspond to steps 501, 502, 503, and 504 of process 500, respectively, as disclosed herein with respect to FIG. 5. Step 1005 of process 1000 may include receiving, from a user, a text caption of the image. The text caption of the image may be received by a device, such as computing device 130, through an input/output device such as I/O devices 165. The text caption of the image may comprise any textual or graphic input from the user relating to or associated with the image. Step 1006 of process 1000 may include integrating with a social media application for posting of the image to an interface where other users can view the image and the text caption. For example, the system of process 1000 may communicate with a social media application installed on computing device 130. The system of process 1000 may transmit the image and the text caption directly to the social media application.

Figure 11:
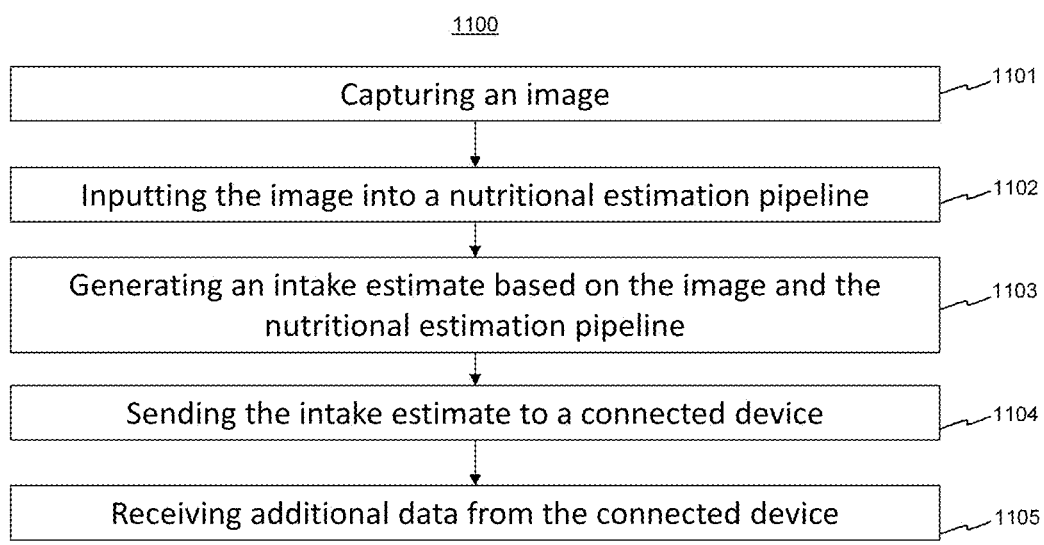
FIG. 11 depicts a flowchart of a process for communicating an intake estimate with a connected device, consistent with disclosed embodiments.

FIG. 11 depicts a flowchart of a process 1100 for communicating an intake estimate with a connected device. Steps 1101 and 1102 of process 1100 may correspond to steps 801 and 802 of process 800, respectively, as disclosed herein with respect to FIG. 8. Step 1103 of process 1100 may correspond to step 505 of process 500, as disclosed herein with respect to FIG. 5. Step 1104 may comprise sending the intake estimate to a connected device. A connected device may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. A connected device may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. The intake estimate may be sent to a connected device over network 110. In some embodiments, the intake estimate may be sent to a connected device. In other embodiments, nutritional information, calorie information, and any other details captured through the nutritional pipeline 100 may be transmitted to the connected device.

Step 1105 of process 1100 may comprise receiving additional data from the connected device. Additional data may be received from the connected device over network 110. The connected device may be configured to collect health information such as physical activity, nutritional intake, medical conditions, medical history, medication lists, and other health information related to a user. The additional data received from the connected device may comprise any information related to the health of the user.

As used herein, unless specifically stated otherwise, being "based on" may include being dependent on, being associated with, being influenced by, or being responsive to. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer-readable medium configured to use an integrated camera to scan food, the non-transitory computer-readable medium storing executable code configured to perform operations comprising:
    capturing an RGB image of the food using the integrated camera;
    inputting the RGB image into an instance detection network configured to detect food items, the instance detection network having been trained on a plurality of reference food items using a neural network;
    segmenting a plurality of food items from the RGB image into a plurality of masks, the plurality of masks representing individual food items;
    classifying a particular food item among the individual food items using a multimodal large language model;
    estimating a volume of the particular food item by overlaying the RGB image with a depth-map to create a point cloud, wherein the depth map is created by monocular depth estimation; and
    estimating the calories of the particular food item using the estimated volume and a nutritional database.

2. The non-transitory computer-readable medium of claim 1, wherein the operations further comprise comparing a first RGB image before intake to a second RGB image after intake, and generating an intake estimate associated with the particular food item.

3. The non-transitory computer-readable medium of claim 1, wherein the operations further comprise comparing a first RGB image after intake to a synthetic image.

4. The non-transitory computer-readable medium of claim 1, wherein the operations further comprise pairing an unlabeled image with a verified mask from the plurality of masks representing an individual food item to optimize a trained classifier.

5. The non-transitory computer-readable medium of claim 1, wherein inputting the RGB image into the instance detection network comprises creating a square around the individual food item.

6. The non-transitory computer-readable medium of claim 1, wherein inputting the RGB image into the instance detection network comprises creating a mask representing multiple food items.

7. The non-transitory computer-readable medium of claim 1, wherein the point cloud is a synthetic point cloud capable of being captured and stored for analysis.

8. The non-transitory computer-readable medium of claim 1, wherein the operations further comprise:
    capturing a video segment using the integrated camera; and
    extracting a plurality of image frames from the video segment.

9. The non-transitory computer-readable medium of claim 8, wherein the extracted plurality of image frames includes the captured RGB image.

10. A computer-implemented method for scanning food, comprising:
    capturing an RGB image of the food using an integrated camera;
    inputting the RGB image into an instance detection network configured to detect food items;
    segmenting a plurality of food items from the RGB image into a plurality of masks, the plurality of masks representing individual food items;
    classifying a particular food item among the individual food items using a multimodal large language model;
    estimating a volume of the particular food item by overlaying the RGB image with a depth-map to create a point cloud, wherein the depth map is created by monocular depth estimation; and
    estimating the calories of the particular food item using the estimated volume and a nutritional database.

11. The computer-implemented method of claim 10, further comprising:
    comparing a first RGB image before food intake to a second RGB image after food intake, and
    generating, based on the comparison, a food intake estimate associated with the particular food item.

12. The computer-implemented method of claim 10, further comprising:
    comparing a first RGB image after food intake to a synthetic image.

13. The computer-implemented method of claim 10, further comprising:
    pairing an unlabeled image with a verified mask from the plurality of masks representing an individual food item to update a trained classifier.

14. The computer-implemented method of claim 10, wherein inputting the RGB image into the instance detection network includes at least one of:
    creating a square around the individual food item; or
    creating a mask representing multiple food items.

15. The computer-implemented method of claim 10, further comprising:
    creating training data for synthetic data generation through automatic dataset generation via an assets database; and
    generating segmented outputs from the synthetic data generation across various combinations of food items, lighting conditions, and other physical environments.

16. The computer-implemented method of claim 15, wherein the segmented outputs are used for volume and calorie estimation.

17. The computer-implemented method of claim 10, further comprising:
    capturing a video segment using the integrated camera; and
    extracting a plurality of image frames from the video segment.

18. The computer-implemented method of claim 17, wherein the extracted plurality of image frames includes the captured RGB image.

19. The computer-implemented method of claim 10, wherein the monocular depth estimation comprises estimating a distance of a plurality of pixels in the RGB image from the integrated camera.

20. The computer-implemented method of claim 10, wherein the monocular depth estimation comprises predicting depth information of the particular food item based on the RGB image.

* * * * *